United States Patent
Vohra et al.

(10) Patent No.: US 7,014,832 B2
(45) Date of Patent: Mar. 21, 2006

(54) SIMULTANEOUS RECOVERY OF POTASSIUM CHLORIDE AND KCL ENRICHED EDIBLE SALT

(75) Inventors: Rajinder Nath Vohra, Bhavnagar (IN); Pushpito Kumar Ghosh, Bhavnagar (IN); Ashokkumar Bhagvanjibhai Kasundra, Bhavnagar (IN); Himanshu Labhshanker Joshi, Bhavnagar (IN); Rohit Harshadray Dave, Bhavnagar (IN); Maheshkumar Ramniklal Gandhi, Bhavnagar (IN); Kaushik Jethalal Langalia, Bhavnagar (IN); Koushik Halder, Bhavnagar (IN); Sohan Lal Daga, Bhavnagar (IN); Ramjibhai Devjibhai Rathod, Bhavnagar (IN); Hasina Hajibhai Deraiya, Bhavnagar (IN); Purashottambhai Ravajibhai Jadav, Bhavnagar (IN); Vadakke Puthoor Mohandas, Bhavnagar (IN); Abdulhamid Usmanbhai Hamidani, Bhavnagar (IN)

(73) Assignee: Council of Scientific and Industrial Research, New Delhi (IN)

( * ) Notice: Subject to any disclaimer, the term of this patent is extended or adjusted under 35 U.S.C. 154(b) by 137 days.

(21) Appl. No.: 10/814,779

(22) Filed: Mar. 30, 2004

(65) Prior Publication Data

US 2005/0220697 A1 Oct. 6, 2005

(51) Int. Cl.
*C01D 3/06* (2006.01)

(52) U.S. Cl. .................. 423/499.1; 423/158; 423/166; 423/178; 423/184; 423/499.4; 23/302 R; 23/302 T; 23/303; 23/304

(58) Field of Classification Search .............. 423/166, 423/158, 163, 178, 184, 197, 199, 499.1, 423/499.4; 23/302 T, 304, 302 R, 303
See application file for complete search history.

(56) References Cited

U.S. PATENT DOCUMENTS

| | | | |
|---|---|---|---|
| 3,099,528 A | | 7/1963 | Hadzeriga |
| 3,323,875 A | * | 6/1967 | Been .......................... 23/299 |
| 3,642,454 A | * | 2/1972 | Nylander .................... 23/297 |
| 3,644,102 A | * | 2/1972 | Svanoe ....................... 23/298 |
| 3,994,531 A | | 11/1976 | Dillard, Jr. et al. |
| 4,140,747 A | | 2/1979 | Sadan |
| 5,626,904 A | * | 5/1997 | Frederiksen ................ 426/649 |
| 6,599,565 B1 | * | 7/2003 | Umai et al. .................. 427/189 |
| 6,776,972 B1 | * | 8/2004 | Vohra et al. ................ 423/166 |
| 6,890,509 B1 | * | 5/2005 | Vohra et al. ............. 423/499.5 |
| 2003/0080066 A1 | | 5/2003 | Vohra et al. |

FOREIGN PATENT DOCUMENTS

| | | | | |
|---|---|---|---|---|
| BR | 9806380 A | * | 9/2000 | |
| CN | 1127219 A | * | 7/1996 | |
| CN | 1248549 A | * | 3/2000 | |
| CN | 1271541 A | * | 11/2000 | |
| CN | 1275531 A | * | 12/2000 | |
| GB | 1 500 288 | | 8/1978 | |
| JP | 02-022122 A1 | | 1/1990 | |
| WO | WO-03/064323 A1 | | 1/2002 | |

OTHER PUBLICATIONS

Hildebrand, J. H., "Extraction of Potash and other Constituents from sea water bittern", J. of Industrial and Engineering Chemistry, 1918, vol. 10, No. 2, pp. 96-106.*
Ullmann's Encyclopedia of Industrial Chemistry, Sixth edition, 2002 (Electronic version), "Potassium compounds".*
Ullmann's Encyclopedia of Industrial Chemistry, Sixth edition, 2002 (Electronic version), "Magnesium compounds".*
Seshadri, K., et al., "Manufacture of Potassium chloride and byproducts from Sea Bittern", Salt Research and Industry, Apr.-Jul. 1970. vol. 7, pp. 39-44.
Balarew, et al., "Improved Treatment of Waste Brines", International Symposium on Salt, 2000, pp. 551-554.

* cited by examiner

Primary Examiner—Ngoc-Yen Nguyen
(74) Attorney, Agent, or Firm—Darby & Darby

(57) ABSTRACT

The present invention relates to recovery of industrial grade potassium chloride and low sodium edible salt from bittern as part of an integrated process. The process comprises, mixing low sulphate concentrated feed bittern (a by-product of salt industry) of density 31.5 to 32.5° Be (sp.gr. 1.277–1.289) with high density end bittern of density 36.5 to 37.5° Be' (sp.gr. 1.336–1.35), thereby producing low sodium carnallite, from which industrial grade potassium chloride is produced. The resultant bittern is evaporated in forced evaporation system, thereby producing crude carnallite, from which low sodium salt that would be beneficial to persons suffering from hypertension is produced. When sulphate-rich bittern is used, such bittern is desulphated with $CaCl_2$ that is generated from carnallite decomposed liquor through reaction with lime, and wherein low $B_2O_3$-containing $Mg(OH)_2$ is a by-product. The entire content of potassium in feed bittern is recovered in the process of the invention.

14 Claims, No Drawings

SIMULTANEOUS RECOVERY OF POTASSIUM CHLORIDE AND KCL ENRICHED EDIBLE SALT

FIELD OF THE INVENTION

The present invention relates to a new process for the recovery of industrial grade potassium chloride and low sodium edible salt from bittern. Potassium chloride is an essential plant nutrient and is mainly used as fertilizer either as single fertilizer or in combination with other plant nutrients. Potassium chloride is also used in several industries like dyes, soaps, detergents, food, pharmaceuticals and also as starting material for preparing other potassium chemicals like potassium hydroxide and potassium carbonate. The purity requirement for these applications is more stringent, requiring purity >98.0% in most cases. Low sodium salt, which is a mixture of sodium chloride and potassium chloride, is a balanced salt especially suitable for persons suffering from hypertension and heart diseases.

BACKGROUND OF THE INVENTION

Potassium chloride is an essential plant nutrient and is mainly used as fertilizer either as single fertilizer or in combination with other plant nutrients. Potassium chloride is also used in several industries like dyes, soaps, detergents, food, pharmaceuticals and also as starting material for preparing other potassium chemicals like potassium hydroxide and potassium carbonate. The purity requirement for these applications is more stringent, requiring purity >98.0% in most cases, Low sodium salt, which is a mixture of sodium chloride and potassium chloride, is a balanced salt especially suitable for persons suffering from hypertension and heart diseases.

J. H. Hildebrand ('Extraction of Potash and other Constituents from sea water Bittern', *Journal of Industrial and Engineering Chemistry*, vol. 10, no. 2, 1918 pp 96–106) discloses theoretical aspects of recovery of potash from sea bittern and proposes a process for extraction. According to this process, bittern is evaporated at a temperature between 100–120° C., thereby forming a solid mixture of sodium chloride and kieserite ($MgSO_4.H_2O$), separating this mixture under hot conditions in a heated centrifuge, and cooling the mother liquor in a cooler for separation of carnallite. Carnallite is decomposed and washed with water to produce potassium chloride. The drawback of this process is that it is demanding in terms of energy requirement and KCl obtained from the carnallite is not of industrial grade.

K. Seshadri et al ('Manufacture of Potassium chloride and byproducts from Sea Bittern' *Salt Research and Industry*, April–July 1970, Vol. 7, page 39–44) discloses further concentration of bittern in solar pans. After removing crude salt and Sels' mixts [mixture of NaCl and Epsom salt ($MgSO_4.7H_2O$)], mixed salt [mixture of NaCl, $MgSO_4.7H_2O$, $KCl.MgSO_4.3H_2O$ (kainite) and $MgCl_2.6H_2O$ is formed in solar pans. Mixed salt is dispersed with high density bittern in proper proportion and heated to a temperature of 110° C. when kieserite ($MgSO_4.H_2O$) is formed which is separated by filtering the slurry under hot conditions. The filtrate is cooled to ambient temperature, when carnallite ($KCl.MgCl_2.6H_2O$) crystallizes out. Carnallite is decomposed with water to get a solid mixture of sodium chloride and potassium chloride while magnesium chloride goes into solution. Solid mixture of potassium chloride and sodium chloride is purified using known techniques to produce pure potassium chloride. The drawbacks of this process are: Mixed Salt (containing kainite) is obtained only after two earlier solid evaporates, i.e., crude salt and sels' mixt, are removed separately. This is done by solar evaporation in pans, removal of salts from pans, and pumping of liquid into intermediate pans—all of which are highly labour intensive. Kainite type mixed salt is to be processed further by mixing the same with high-density bittern and using hot extraction technique followed by cooling to exact carnallite from mixed salt. This is a tedious and energy intensive operation and the efficiency of KCl recovery is low. Carnallite which is obtained by this process contains substantial quantity of sodium chloride which remains along with potassium chloride after decomposition of the double salt, and requires to be purified by the process of hot leaching which is energy intensive.

In U.S. Pat. No. 3,099,528, dated Jul. 30, 1963, entitled "Recovery of values from Natural Lake and Sea Brines" carnallite is claimed to be produced as one of the products. However this carnallite contains substantial quantity of sodium chloride and on decomposition produces sylvinite which again requires floatation to produce potassium chloride.

In another process being followed by Kali-und Salz in Germany, KCl is produced from sylvinite through an electostatic separation technique. This process is energy intensive.

In Ullmann's Encyclopedia of Industrial Chemistry, Sixth Edition, 1999, under the Chapter, Potassium compounds, carnallite is produced in normal manner by solar evaporation of bittern obtained from Dead Sea. However the carnallite contains large quantity of sodium chloride impurity with the result that the product obtained after decomposition with water is potassium chloride contaminated with substantial quantity of sodium chloride which requires froth floatation or hot leaching operations to produce potassium chloride of fertiliser grade quality. Hot leaching process involves processing carnallite decomposed product (CDP) with equilibrium liquor (saturated solution of sodium chloride and potassium chloride) at high temperature, filtering hot to remove solid sodium chloride and cooling the filtrate to produce potassium chloride. The main problem with this technique is that during the process of cooling of filtrate for crystallization of KCl, some sodium chloride also comes out, with the result potassium chloride is contaminated with about 3% NaCl. Secondly, on account of CDP containing about 0.5% to 1.0% $Mg^{+2}$, the same is extracted into the equilibrium liquor, which reduces the extraction efficiency of the liquor. In case of froth floatation, organic frothing agents have to be added for purification of potassium chloride, which may be hazardous to soils and the environment in general. In another reported process, called cold crystallisation technique, sodium chloride is removed from carnallite by fractional crystallisation including wet sieving thereby producing carnallite containing about 4 to 5% NaCl.

Chinese Patent CN 1275531 dated Dec. 6, 2000 by Song Youlin (CN) titled "Method for directly obtaining low sodium carnallite" describes addition of solid bischofite into bittern to crystallise out low sodium carnallite from which potassium chloride can be produced. In this process it may be necessary to evaporate the bittern obtained after recovery of carnallite to very high densities to obtain bischofite. No mention is made of the efficiency of recovery and how the residual $K^+$ in the effluent is dealt with Chinese Patent CN 1127219, dated Jul. 24, 1996, by Song Yioian (CN) and Jinyu Zhou (CN), titled "Preparing large crystal high purity potassium chloride by adding halogen method to remove Na and isolate K" discloses blending of solid carnallite with different types of bittern.

Chinese Patent CN 1248549 dated Mar. 29, 2000 by Li Lianglin (CN), Li Yunping (CN) and Wei Xinjun (CN), titled "Process for preparing high-quality potassium containing products by salt-field method" discloses extraction of potassium, wherein bittern is first introduced in sodium pool, during day time when temperature is high, thereby separating out salt minerals of sodium chloride etc., and during night time when temperature is low, the bittern is introduced into potassium pool to separate out potassium salts. The process is repeated several times till potassium ion content of bittern is less than 2/1000. However, as mentioned in the patent, potassium content of product is about 52%. Moreover, such operations even though interesting in concept have practical limitations.

U.S. Pat. No. 3,994,531, dated Nov. 30, 1976, by Dillard Jr.; David S; Davis II; J. Gilbert; Every; and Richard L., entitled "Method of solution mining potassium chloride from subterranean deposits"; discloses an improved method of solution ruining of potassium chloride from subterranean ore deposits containing both potassium chloride and sodium chloride. In this process an aqueous medium is passed through ore deposits so that potassium chloride and sodium chloride are dissolved therein. In a second subterranean deposit containing magnesium chloride, aqueous medium is also passed so as to obtain a solution of magnesium chloride. Both these solutions are combined and an aqueous solution containing potassium chloride, sodium chloride and magnesium chloride in specific proportion is produced, and solubility of potassium chloride is reduced. The combined aqueous brine solution is concentrated and concentrated solution is cooled to cause the precipitation of substantially pure potassium chloride. Application of the process to sea water systems may, however, not be straightforward.

U.S. Pat. No. 4,140,747 dated Feb. 20, 1979, by Sadan and Abraham, titled "Process for production of potassium chloride and magnesium chloride" discloses a process wherein potassium chloride and magnesium chloride hexahydrate (Bischofite) are produced from carnallite or carnallite containing sodium chloride. The process comprises heating carnallite at a temperature of 70° C. in the presence of added water or heating to 167.5° C. without added water. Solid potassium chloride is then separated. In the residual brine, carnallite is separated by evaporation or by lowering temperature and it is recycled to starting stage. Residual solution consists essentially of magnesium chloride, which is recovered as bischofite. Heating of carnallite is carried out under pressure and lowering of temperature is done by flash evaporation. This process makes no special reference regarding the purity of KCl obtained.

In all of the above processes, which have focus on a single product, only a part of the KCl in bittern is actually recovered and the rest has to be recycled to increase yield of KCl. Moreover, even in those cases where the purity of KCl is high, it is well known that production of KCl in the field through carnallite can lead to deposition of insoluble particles, including organic matter, in the carnallite which are difficult to separate. These insolubles affect the quality perception of the product.

U.S. Pat. No. 3,099,528 dated Jan. 10, 1962 titled "Recovery of values from Natural Lake and Sea Brines" discloses a process wherein the main objective is to produce KCl via sylvinite obtained from crude carnallite. Calcium Chloride required to desulphate the brine in order to promote carnallite formation is produced by passing heavy gypsum slurry to an ion-exchange system utilizing cationic exchange resin in its hydrogen form. In the ion-exchange system, Calcium ions of the influent gypsum slurry are exchanged for hydrogen ions of ion-exchange resin, yielding $H_2SO_4$ as the effluent. Upon eluting the Calcium loaded resin with HCl eluent, an eluate solution of Calcium Chloride is obtained. This exchange must be carried out at elevated temperature.

UK Patent 1500288 dated Aug. 2, 1978 titled "Purification of Brine", discloses a process wherein the sulphate content of an alkali chloride containing brine is reduced to as low as 2 g/L of sulphate by adding a stochiometric excess of calcium chloride while maintaining the pH of brine in the range 7 to 9 by the addition of HCl in the temperature range 30° C. to 50° C. The application discussed is direct utilization of brine for production of chloralkali through a purification process. While use of outsourced $CaCl_2$ would be alright for desulphatation of small quantities of sulphate, it would be advantageous to generate $CaCl_2$ from bittern and time, taking further advantage of co-generation of $Mg(OH)_2$ as a useful by-product.

Chr. Balarew, D. Rabadjieva and S. Tepavitcharova ('Improved Treatment of Waste Brines' International Symposium on Salt 2000, page 551–554) disclose recovery of marine chemicals. In the process described, bittern is desulphated with the objective of recovering gypsum and magnesium hydroxide in pure form prior to recovery of KCl. The $CaCl_2$ required for desulphatation of bittern is generated from the reaction of lime and desulphated bittern. The principal drawbacks of this process are; (i) by separating out the Mg in bittern prior to recovery of KCl, no advantage is taken of the lower solubility of carnallite vis-à-vis KCl which would have enabled KCl to be obtained with less of evaporation of bittern, (ii) the KCl would inevitably be contaminated with large quantites of NaCl which would make the process of purification both tedious and energy intensive, and (iii) since desulphated virgin bittern contains significant quantities of boron, the MgO that would be produced from $Mg(OH)_2$ by the method described would inevitably be contaminated with high impurity levels of $B_2O_3$.

U.S. Patent Application 20030080066 dated Oct. 29, 2001 by Vohra, Rajinder N. et al. discloses an integrated process for recovery of high purity salt, potassium chloride, and end bittern containing 7.5 g/L Br. The process is based on desulphatation of brine with Distiller waste of soda ash industry or calcium chloride generated from limestone and acid. The main drawback of the patent application is that the process is less attractive when Distiller waste is not available in the vicinity and the carnallite obtained is contaminated with high extent of NaCl necessitating further purification.

Reference is made to "The Heinz Handbook of Nutrition" by Benjamin and Burton, published by McGraw Hill Book Co. Second Edition, page 132–133, wherein it is mentioned that the dietary needs for potassium roughly equals that of sodium.

Alves de Lima et al. in Brazilian Patent BR 9806380 A, 12 Sep. 2000, titled "Production of dietetic salt by mixing", state that low sodium dietetic salt is produced by mixing sea salt with potassium chloride, potassium iodate and sodium aluminum silicate, thereby mixing 4 parts of sodium chloride with 6 parts of potassium chloride. The drawback of this process is that one has to separately procure sodium chloride and potassium chloride and blend them together so as to make a solid mixture. Apart from the fact that components of low sodium salt are first made in pure form and then remixed which would clearly be costlier than if such a mixture could be obtained directly, there may also be difficulty in preparing a truly solid homogeneous mixture.

Chinese Patent CN 1271541 A, 1 Nov. 2000 to Shuqing Wang in, titled "Multi-element low sodium nutritive sale", discloses preparation of low sodium nutritive salt by crystallising salt from saturated brine under vacuum. The salt is then mixed uniformly with salts such as KCl and $MgSO_4.7H_2O$, followed by mixing with $KIO_3$ and $Na_2SeO_3$ solutions, drying and finally mixing with active Ca and Zn lactate. The drawback of this process is that apart from the difficulty of mixing various constituents in a homogeneous solid mixture, salt is to be crystallized from hot saturated brine involving high energy consumption thereby increasing the cost of production.

Japanese Patent Abstract No. 02022122 dated Jan. 25, 1990, titled "Production of Composite Salt consisting of Sodium Chloride and Potassium Chloride" discloses a process wherein sea water is selectively concentrated through an Ion-exchange membrane and further concentrated in a vacuum evaporator to get desired level of NaCl and KCl in solution. The process requires sophisticated ion-exchange membrane technology and would be highly energy intensive as large volumes of water will need to be evaporated.

PCT International Application No. PCT/IN02/00018 dated Jan. 31, 2002 discloses a method of producing KCl-enriched low sodium salt from bittern. One drawback of the method is that, in case the crude carnallite is produced in the field, it can be contaminated with insoluble matter such as dust, trapped organic matter, ubiquitous black particles, etc., which are difficult to remove from the carnallite decomposed product unless recourse is taken to re-dissolution, filtration and recrystallisation which, therefore, defeats the purpose of the invention.

Reference is made to the Chapter in Ullmann's Encyclopedia of Industrial Chemistry, Sixth Edition, 2002 (Electronic Version) dealing with Magnesium Compounds written by Margarete Seeger, Walter Otto, Wilhelm Flich, Friedrich Bickelhaupt and Otto, S. Akkerman, wherein the process of preparation of magnesium hydroxide from seawater is described. It is mentioned therein that preparation of low boron containing magnesia requires over liming of the seawater up to pH 12 to maintain $B_2O_3$ content less than 0.05% in magnesia. Overliming involves higher lime cost, need for neutralization of supernatant and results in a colloidal suspension which is more difficult to filter. Another drawback not circumvented is the formation of calcium chloride-containing effluent, which is discharged back into the sea.

OBJECTS OF THE INVENTION

Its is therefore an object of the present invention to provide an integrated process for the recovery of industrial grade potassium chloride and low sodium edible salt from bittern.

Another object of the present invention is to filter the feed bittern through known techniques so as to eliminate all extraneous matter and thereby obtain KCl and low sodium salt free from extraneous matter.

Another object of the present invention is to produce high purity water as co-product along with pure KCl and low sodium salt.

Another object of the present invention is to produce 32.0° Be'–32.5° Be' (sp.gr. 1.263–1.288) bittern in salt pans through solar evaporation during summer months and thereafter to carry out all downstream operations with the bittern in a plant to maintain consistent product quality and to be able to manufacture throughout the year to reduce capital investment.

Another object is to produce from the pure and crude carnallites two useful solid products of commercial value through simple aqueous decomposition of the respective carnallites without the need for any purification apart from centrifugation and a wash with small quantity of water to remove entrained $MgCl_2$.

Another object is to utilize the $MgCl_2$ in the carnallite decomposed liquors (CDL) produced as described below for production of $CaCl_2$ through treatment with lime.

Another object of the present invention is to take advantage of the low boron content of CDL to produce low boron-containing $Mg(OH)_2$ which can be converted into low boron magnesia without the necessity of any additional step for removal of boron.

Another object of the present invention is to obtain easily filterable $Mg(OH)_2$ by avoiding over-liming which is the prevalent practice to obtain magnesia with low boron impurity.

Another object of the present invention is to utilise the $CaCl_2$ solution for the desulphatation of feed bittern to promote carnallite formation, as is well known in the prior as, in of discharging it into the sea as is the current general practice.

Another object of the present invention is to recycle the KCl that remains dissolved in CDL produced in the process.

Another object of the present invention is to recover all KCl in bittern except for the small amount lost in end bittern that is ultimately disposed of.

Another object of the present invention is to recycle the major part of the end bittern in the process, convert, if required, a small part of the remaining amount for additional production of $CaCl_2$, and utilise the balance amount for efficient production of bromine and $MgCl_2$, or for production of derivatives therefrom.

Another object is to produce high purity gypsum from the desulphation process that can be used for production of white cement or for manufacture of plaster of Paris.

Another object is to eliminate waste generation in the plant by almost fully utilizing all components of the feed bittern.

SUMMARY OF INVENTION

Accordingly, the present invention provides an integrated process for the simultaneous recovery of industrial grade potassium chloride and low sodium edible salt with overall KCl yield of 90–95%, which comprises
 (i) desulphatation of bittern with a solution of calcium chloride;
 (ii) subjecting the desulphated bittern to evaporation until density of 32 to 32.5° Be' (sp.gr. 1.283–1.288) is achieved;
 (iii) mixing the desulphated bittern obtained in step (ii) with a concentrated solution of $MgCl_2$ to obtain high purity carnallite and a residual bittern;
 (iv) decomposing the carnallite with water to obtain ca. 60% of overall KCl and a first carnallite decomposed liquor;
 (v) crystallizing from the residual bittern residual NaCl and KCl in the form of crude carnallite and thereby obtaining a $MgCl_2$-rich end bittern;
 (vi) decomposing the crude carnallite obtained in step (v) with water to produce KCl-enriched low sodium salt in 30–35% overall yield with respect to KCl in the original 32 to 32.5° Be' (sp.gr. 1.283–1.288) bittern, as well as a second carnallite decomposed liquor;

(vii) collecting the first and second carnallite decomposed liquors obtained in steps (iv) and (vi) above and treating the resulting mixture with upgraded lime to generate low boron magnesium hydroxide and filtrate containing $CaCl_2$ and KCl;

(viii) recycling the filtrate obtained in step (vii) above to step (i) above for desulphatation of bittern while simultaneously recovering KCl lost in carnallite decomposed liquors;

(ix) recycling the $MgCl_2$-rich end bittern of step (v) for sustained production of high purity carnallite in step (iii) and also for production of $CaCl_2$, and (x) recycling the end bittern to reclaim excess $MgCl_2$ and bromine and produce $MgCl_2$ and its derivatives.

In one embodiment of the invention, the density of bittern taken in step (i) is in the range of 28–30° Be' (s.g 1.24–1.26).

In another embodiment of the invention, in step (i), the stoichiometric ratio of $CaCl_2$ to $SO_4^{2-}$ in the bittern is in the ratio of 0.9:1 to 1.1:1 and preferably 1:1.

In another embodiment of the invention, in step (iii), one part of 32 to 32.5° Be' of the desulphated bittern obtained in step (ii) (sp.gr. 1.283–1.289) is mixed with 2.0–2.5 parts of the end bittern containing 400–440 g/L $MgCl_2$ and the density of the resultant bittern is in the range of 34.0–35.0° Be' (sp.gr. 1.306–1.318) and more preferably in the range of 34.4–34.6° Be' (sp.gr. 1.311–1.315).

In another embodiment of the invention, before step (iii), the 32–32.5° Be' (s.g. 1.283–1.289) bittern is filtered if required to remove insoluble matter such as dust. black particles and organic matter.

In yet another embodiment of the invention, in step (iii) the NaCl content of carnallite is in the range of 0.2–2.0% and more preferably in the range of 0.2–0.4%.

In another embodiment of the invention, in step (iv) the purity of KCl obtained is in the range of 97–99% after washing with water to remove adhering $MgCl_2$.

In another embodiment of the invention, the residual bittern is concentrated to a final density of 36.5–37.2° Be' (s.g. 1.306–1.318) either by solar evaporation or preferably through forced evaporation in an open pan or still more preferably in a multiple effect evaporator for recovery of water.

In another embodiment of the invention, in step (v) the crude carnallite contains 14–16% KCl and 18–22% NaCl.

In another embodiment of the invention, the low sodium salt contains 40–50% KCl and 50–60% NaCl.

In another embodiment of the invention, the combined carnallite decomposed liquors contain 15–20 mg/L $B_2O_3$ and 60–80 g/L Mg.

In another embodiment of the invention, the $Mg(OH)_2$ obtained is converted into MgO containing <0.02% $B_2O_3$.

In another embodiment of the invention, the filtrate contains 15–30% $CaCl_2$ and 5–10% KCl.

In another embodiment of the invention, the problem of NaCl content in bittern is managed in a way so as to recover 60–70% of KCl almost free of NaCl impurity, the balance KCl being recovered in the form of a highly nutritious edible salt that contains the entire NaCl load in bittern.

In an embodiment of the present invention, low sodium carnallite is produced from desulphated bittern of 28 to 30° Be' (sp.gr. 1.24–1.26), by concentrating the same in solar pans till bittern reaches density of 32 to 32.5° Be' (sp.gr. 1.283–1.288) and mixing concentrated bittern with end bittern of density 36.5 to 37° Be' (sp.gr. 1.33–1.34) (produced in process itself) in a stirred vessel, thereby crystallizing out carnallite, which after filtration contains 0.3 to 2.0% NaCl and which is free from extraneous matter like dust etc. as the concentrated bittern obtained from field is filtered by known techniques and carnallite is produced in plant environment and not in salt field In another embodiment of present invention, low sodium carnallite obtained as above is decomposed with water producing solid carnallite decomposed product which on ambient temperature water washing produces industrial grade potassium chloride containing a minimum of 98% KCl and maximum of 1.0% NaCl.

In another embodiment of present invention about 60% of KCl contained in concentrated bittern of 32 to 32.5° Be' (sp.gr. 1.283–1.288) is recovered as high purity carnallite In another embodiment of present invention, resultant bittern of 34 to 35° Be' (sp.gr. 1.30–1.34) when evaporated in forced evaporation system, till density of bittern reaches 36.5 to 37° Be' (sp.gr. 1.33–1.342), produces on cooling a solid mixture of sodium chloride and carnallite formed from residual potassium chloride.

In another embodiment of present invention, solid mixture obtained from end bittern of density 36.5 to 37° Be' (sp.gr. 1.33–1.342), when decomposed with water, produces a solid product which is directly marketable as low sodium salt, containing 40 to 50% KCl and 50 to 60% NaCl.

In another embodiment of the present invention both industrial grade potassium chloride and low sodium salt are of high purity and free from all extraneous matter like dust, black particles, and organic matter.

In another embodiment of the present invention high purity water is recovered which is critical to sustain operations in locations such as the Greater Rann of Kutch in India where no fresh water is available.

In another embodiment of the present invention, a part of end bittern is recycled while rest of end bittern is processed anther to produce magnesium hydroxide and calcium chloride, which is used for desulphatation.

In another embodiment of the present invention brine can be desulphated instead of bittern so as to first recover high purity salt as revealed in the prior art and thereafter the bittern can be used for production of industrial grade potassium chloride and low sodium salt.

Accordingly the present invention provides an integrated process for efficient preparation of carnallite with <2% NaCl content and 60% yield w.r.t. KCl in bittern through mixing of desulphated bitterns of 32.0–32.5° Be' (sp.gr. 1.28–1.288) and 36.5–37.2° Be' (sp.gr. 1.33–1.342), in the ratio of 1:2.5, which are then processed by ambient temperature decomposition in presence of appropriate quantity of water followed by centrifugation to yield directly KCl of 98–99% purity.

In another embodiment, the present invention utilizes the bittern obtained after pure carnallite recovery for production of crude carnallite (a mixture of NaCl and carnallite) through forced evaporation of the bittern and wherefrom low sodium edible salt containing 40–45% KCl and 50–55-% NaCl—i.e., in a ratio similar to that indicated to be ideal in the literature—can be obtained in 90% yield while simultaneously yielding $MgCl_2$-rich end bittern containing 400–440 g/L $MgCl_2$ and 7.0–7.5 g/L Br.

The present invention relates to simultaneous recovery of industrial grade potassium chloride and low sodium KCl-enriched salt from bittern by an improved process, wherein all raw materials except lime are generated from the bittern itself, and by-products generated in the process are fully utilized. As a result of this, the essential process of desulphatation that is fundamental to recovery of the above potassium products, is carried out with $CaCl_2$ generated in the process and at the same time useful by-products, namely low boron magnesia and high quality powdered gypsum, are also obtained in addition to distilled water.

Accordingly the present invention provides an improved process for simultaneous recovery of industrial grade potassium chloride and low sodium salt from bittern with overall efficiency of recovery of 90–95% w.r.t. KCl in bittern, which comprises of (i) desulphatation of bittern of density 28–30° Be' (sp.gr. 1.24–1.26), initially by adding outsourced calcium chloride typically in the stoichiometric ratio of 0.9:1 to 1.1:1 w.r.t. sulphate in bittern and subsequently with calcium chloride obtained from the reaction of carnallite decomposed liquor and lime, (ii) evaporation of desulphated bittern, in a solar pan, till density of 32 to 32.5° Be' (sp.gr. 1.283–1.288) is reached, thereby taking advantage of the solar energy to effect a part of the concentration and at the same time to crystallize out unwanted sodium chloride from bittern without significant loss of KCl, (iii) filtration of the bittern to eliminate all insoluble matter, (iii) mixing such bittern with 2.5 parts by volume of a solution containing 400–440 g/L $MgCl_2$, initially outsourced, and subsequently recycled in the process itself to produce high purity carnallite, (iv) obtaining ca. 60% of overall KCl in bittern in the form of such high purity KCl with >98% purity, (v) concentrating the residual bittern through forced evaporation to throw out maximum extent of KCl (as carnallite) and NaCl which can then be processed for production of KCl-enriched low sodium salt in 30–35% overall yield with respect to KCl in bittern, (vi) collecting the carnallite decomposed liquor rich in $MgCl_2$ and KCl and containing only 15 mg/L $B_2O_3$ and treating with upgraded lime to generate low boron magnesium hydroxide along with aqueous solution containing 15–30% $CaCl_2$ and 5–10% KCl, (vi) utilizing the $CaCl_2$ solution for desulphatation of bittern and recycling of KCl lost in carnallite decomposed liquor, (vii) recycling the $MgCl_2$-rich end bittern for sustained production of high purity carnallite and also for production of additional quantities of $CaCl_2$ as may be required, and (viii) utilizing any excess $MgCl_2$ for efficient recovery of bromine and for production of $MgCl_2.6H_2O$ and its derivatives.

The invention follows the following process steps:

1) Bittern of density 28–30° Be' (sp.gr. 1.239–1.261) is desulphated with calcium chloride obtained in step 10 below:
2) The desulphated bittern is allowed to concentrate in solar pans by known techniques till a density of 32.0–32.5° Be' (sp.gr. 1.283–1.288) is reached at which point the KCl concentration in bittern is in the range of 35–40 g/L and NaCl 25–30 g/L.
3) The bittern as obtained in (2) is filtered to remove extraneous matter.
4) 2.5 parts by volume of end bittern of density 36.5–37.0° Be' (sp.gr. 1.33–1.342) as obtained in step (7) below is added into one part by volume of the bittern of step (3) in a stirred vessel and stirring continued for 35–45 minutes under ambient conditions, whence carnallite is precipitated.
5) The carnallite obtained in step (4) is separated in a centrifuge and the residual bittern transferred into a multiple effect evaporation system.
6) 1 part by weight of carnallite of step (5) is decomposed with 0.45 parts by weight of water by known technique and centrifuged to yield KCl in 75% yield w.r.t. KCl in carnallite. The carnallite decomposed liquor (CDL) containing 300–320 g/L $MgCl_2$ and 50–55 g/L KCl is separately collected.
7) The residual bittern of step (5) is concentrated in a forced evaporation system, followed by cooling, thereby crystallising out sodium chloride along with residual potassium chloride in the form of carnallite till density of 36.5 to 37.0° Be' (1.33–1.342) is reached, which is the density of original end bittern.
8) The mixture of sodium chloride and carnallite as obtained in (7) is decomposed with water as in step (6) above to produce CDL and low sodium salt containing 40–50% KCl and 50–60% NaCl.
9) The CDLs of steps (6) and (8) are mixed together, topped up with end bittern, if required, treated with slaked lime to effect 80–90% neutralization, and filtered to obtain $Mg(OH)_2$ and filtrate containing 15–30% $CaCl_2$ and 22–40 g/L KCl.
10) The filtrate of step (9) is used in the process of step (1) and thereafter steps (2)–(9) are repeated.

Novel Inventive Steps Along with Advantages of the Present Invention are Given Below:

The main inventive step is the recognition that NaCl and KCl in bittern can be disproportionated in a manner that one portion is almost completely free of NaCl whereas the other portion is enriched in NaCl and both products are useful without further need for purification. Another inventive step is the use of carnallite decomposed liquor for generation of calcium chloride and low boron magnesia, wherein the former is used for desulphatation of bittern and, in the process, gets converted into high quality gypsum. Another inventive step is an optimum use of the combination of solar evaporation and forced evaporation to maximize energy efficiency while at the same time ensuring year round operation and consistently high quality of products, besides near-quantitative recovery of KCl in bittern.

The following examples are given as way of illustration and should not be construed to limit the scope of the present invention.

EXAMPLE 1

Raw bittern of 28.5° Be' (sp.gr. 1.244) having composition $Mg^{2+}$=50.9 $gL^{-1}$, $Na^+$=33.4 $gL^{-1}$, $K^+$13.6 $gL^{-1}$, $Ca^{2+}$=traces; $Cl^-$=195.76 $gL^{-1}$, $SO_4^{-2}$=20.4 $gL^{-1}$ was treated with stoichiometric quantity of outsourced calcium chloride having concentration 440 $gL^{-1}$ and the supernatant was subjected to further solar evaporation up to a density of 32.4° Be' (sp.gr. 1.28) at which point it had the following composition: $Na^+$=8.0 $gL^{-1}$, $K^+$, 22.24 $gL^{-1}$, $Mg^{2+}$=86.6 $gL^{-1}$, $SO_4^{-2}$=2.0 $gL^{-2}$. The salt deposited was removed and 3.1 L of this bittern was evaporated further to 35.9° Be' (sp.gr. 1.33) to produce 0.7 kg of crude carnallite having the following composition: KCl, 14%; $MgCl_2$, 30.61%; $CaSO_4$, 0.2%; NaCl, 4.9%. This carnallite was processed with 0.35 kg of water to obtain 0.117 kg of carnallite decomposed product (CDP) exhibiting the following analysis KCl=78.67%. NaCl=12.24%. $MgCl_2$=5.17%. Thus carnallite obtained by conventional means yields KCl with maximum 80% purity, which would require further purification to produce industrial grade KCl.

EXAMPLE 2

In this example 1 L of desulphated bittern of 32° Be' (sp.gr. 1.283) density, having the composition: $K^+$=18.34 $gL^{-1}$, $Na^+$=10.82 $gL^{-1}$, $Mg^{+2}$32 86 $gL^{-1}$, $Ca^{+2}$=3.4 $gL^{-1}$, $SO_4^{-2}$=0.71 $gL^{-1}$, $Cl^-$=284.3 $gL^{-1}$, was mixed with 2.5 L of 37° Be' (sp.gr. –1.342) end bittern having the following analysis.: $-K^+=1.13$ gL$^{-1}$, Na$^+$= 2.45 gL$^{-1}$, Mg$^{+2}$=114 gL$^{-1}$, Ca$^{+2}$=3.58 gL$^{-1}$, SO4$^{-2}$=traces, Cl$^-$=335.2 gL$^{-1}$ and stirred for 30 minutes. Upon filtration, 120 g of wet carnallite [KCl=19.2%, NaCl=2.0%, MgCl$_2$=36.25%, Ca$^{+2}$=traces, SO$_4^{-2}$=traces, H$_2$O (both combined and free)=42.00%] and 3.44 L of 34.5° Be' (sp.gr. 1.312) density filtrate [K$^+$=2.51 gL$^{-1}$, Na$^+$=4.95 gL$^{-1}$, Mg$^{+2}$=95.0 gL$^{-1}$, Ca$^+$=3.63 gL$^{-1}$, Cl$^-$=289.20 gL$^{-1}$, SO$_4^{-2}$=0.2 gL$^{-1}$] were obtained. Recovery of KCl in the form of carnallite was 66.0% w.r.t. KCl in the bittern. The carnallite was decomposed with 66 g of water as per conventional method to produce 18 g of KCl having the following composition: KCl=97.0%, NaCl=2.0%, MgCl$_2$=0.8%. The 34.5° Be' (sp.gr. 1.312) filtrate was concentrated by heating and cooled to obtain 3 L of 37° Be' (sp.gr. 1.34) end bittern and 90 g of crude carnallite (KCl=15.0%, NaCl=22.0%, MgCl2=28.5%), which upon decomposition yielded 30 g of low sodium salt having 40% KCl and 59% NaCl.

EXAMPLE 3

The experiment of Example 2 was repeated except that the stirring time was increased to 45 min instead of 30 min. 105 g of wet carnallite was obtained which analysed for: KCl=19.96%, NaCl=0.37%, MgCl$_2$=36.60%, Ca$^{+2}$=traces, SO$_4^{-2}$=traces, H$_2$O=43%.

The carnallite was decomposed to obtain 16 g of KCl of 98.5% purity and with only 1% NaCl impurity. The resultant bittern of 34.7° Be' (sp.gr. 1.31) measuring 3.4 liter was evaporated to recover crude carnallite weighing 83 g, which was decomposed to produce 27 g of low sodium salt containing 43% KCl and 53% NaCl. The end bittern volume was 3 L, of which 0.5 L was kept aside and 2.5 L was again added into 1 L of fresh 32° Be' (sp.gr. 1.283) bittern and the process repeated to obtain 105 g of pure carnallite (KCl=20.16%, NaCl=0.35%, MgCl$_2$37.34%) and expected quantity of crude carnallite. 2.5 L of the end bittern was once again mixed with 1 L of fresh 32° Be' (sp.gr. 1.283) bittern and 106 g of pure carnallite (KCl=21%, NaCl=0.4%, MgCl$_2$+36.7%) was obtained followed by crude carnallite on heating. 2.5 L of the end bittern was once again mixed with 1 L of fresh 32° Be' (sp.gr. 1.283) bittern and 100 g of pure carnallite (KCl=20.5%, NaCl=0.5%, MgCl$_2$=36.8%) was obtained. This example demonstrates that end bittern can be recycled to obtain consistent yield and quality of pure and crude carnallites for production of pure KCl and low sodium salt. In each batch, the excess amount of end bittern is partly utilized for generating CaCl$_2$ for desulphatation and the remaining excess part may be utilized for production of MgCl$_2$ or derivatives therefrom.

EXAMPLE 4

In this examples the process of Example 3 was conducted with 20 L of 32° Be' (sp.gr. 1.283) desulphated bittern. Appropriate quantity of end bittern from the first cycle was mixed with 16 L of fresh desulphated bittern and the pure carnallite fractions from the two cycles were mixed together and decomposed to obtain 0.62 kg of KCl of 98% purity. Likewise the crude carnallite fractions were mixed and decomposed to produce low sodium salt.

EXAMPLE 5

1 L of CDL (Carnallite Decomposed Liquor) containing 302.6 gL$^{-1}$ MgCl$_2$, 52.5 gL$^{-1}$ KCl and 15.42 mgL$^{-1}$ B$_2$O$_3$ was diluted with 1 L of water and then treated with 220 g of quicklime (CaO) and the resultant slurry was allowed to settle. 1.4 L of filtrate containing 167.8 gL$^{-1}$ CaCl$_2$, 9.48 gL$^{-1}$ MgCl$_2$ and 26.2 gL$^{-1}$ KCl was obtained which was used in place of outsourced CaCl$_2$ in the process of Example 2. The Mg(OH)$_2$ cake was washed with water and converted into MgO. Because of the low concentration of B$_2$O$_3$ in CDL, MgO has less than 0.013% B$_2$O$_3$ even without over liming. In the case of sub-soil bittern, which contains less sulphate, the entire CaCl$_2$ requirement can be generated from the CDL produced in the process of Example 2. However when sea bittern is used, a part of the CaCl$_2$ is also generated from the excess end bittern (37° Be') (sp.gr. 1.283) obtained in the process.

We claim:

1. An integrated process for the simultaneous recovery of industrial grade potassium chloride and low sodium edible salt with overall KCl yield of 90–95%, which comprises
   (i) desulphatation of bittern with a solution of calcium chloride;
   (ii) subjecting the desulphated bittern to evaporation until density of 32 to 32.5° Be' (sp.gr. 1.283–1.288) is achieved;
   (iii) mixing the desulphated bittern obtained in step (ii) with a concentrated solution of MgCl$_2$ to obtain high purity carnallite and a residual bittern;
   (iv) decomposing the carnallite with water to obtain ca. 60% of overall KCl and a first carnallite decomposed liquor;
   (v) crystallizing from the residual bittern residual NaCl and KCl in the form of crude carnallite and thereby obtaining a MgCl$_2$-rich end bittern;
   (vi) decomposing the crude carnallite obtained in step (v) with water to produce KCl-enriched low sodium salt in 30–35% overall yield with respect to KCl in the original 32 to 32.5° Be' (sp.gr. 1.283–1.288) bittern, as well as a second carnallite decomposed liquor;
   (vii) collecting the first and second carnallite decomposed liquors obtained in steps (iv) and (vi) above and treating the resulting mixture with upgraded lime to generate low boron magnesium hydroxide and filtrate containing CaCl$_2$ and KCl;
   (viii) recycling the filtrate obtained in step (vii) above to step (i) above for desulphatation of bittern while simultaneously recovering KCl lost in carnallite decomposed liquors;
   (ix) recycling the MgCl$_2$-rich end bittern of step (v) for sustained production of high purity carnallite in step (iii) and also for production of CaCl$_2$.

2. A process as claimed in claim 1 wherein in step (i) the density of bittern taken is in the range of 28–30° Be' (sp.gr. 1.24–1.26).

3. A process as claimed in claim 1 wherein in step (i) the stoichiometric ratio of CaCl$_2$ to SO$_4^{2-}$ in the bittern is in the ratio of 0.9:1 to 1.1:1, and preferably 1:1.

4. A process as claimed in claim 1 wherein in step (iii), one part of 32 to 32.5° Be' of the desulphated bittern obtained in step (ii) (sp.gr. 1.283–1.289) is mixed with 2.0–2.5 parts of the end bittern containing 400–440 g/L MgCl$_2$ and the density of the resultant bittern is in the range of 34.0–35.0° Be' (sp.gr. 1.306–1.318) and more preferably in the range of 34.4–34.6° Be' (sp.gr. 1.311–1.315).

5. A process as claimed in claim 1 wherein before step (iii) the 32–32.5° Be' (sp.gr. 1.283–1.289) bittern is filtered if required to remove insoluble matter such as dust, black particles and organic matter.

6. A process as claimed in claim 1 wherein in step (iii), the NaCl content of carnallite is in the range of 0.2–2.0%, preferably in the range of 0.2–0.4%.

7. A process as claimed in claim 1 wherein in step (iv) the purity of KCl obtained is in the range of 97–99% after washing with water to remove adhering $MgCl_2$.

8. A process as claimed in claim 1 wherein in step (v), the residual bittern is concentrated to a final density of 36.5–37.2° Be' (sp.gr. 1.306–1.318) either by solar evaporation or preferably through forced evaporation in an open pan or still more preferably in a multiple effect evaporator for recovery of water.

9. A process as claimed in claim 1 wherein in step (v) the crude carnallite contains 14–16% KCl and 18–22% NaCl.

10. A process as claimed in claim 1 wherein in step (vi) the low sodium salt contains 40–50% KCl and 50–60% NaCl.

11. A process as claimed in claim 1 wherein in step (vii), the combined carnallite decomposed liquors contains 15–20 mg/L $B_2O_3$ and 60–80 g/L Mg.

12. A process as claimed in claim 1 wherein in step (vii), the $Mg(OH)_2$ obtained is converted into MgO containing <0.02% $B_2O_3$.

13. A process as claimed in claim 1 wherein in step (vii), the filtrate contains 15–30% $CaCl_2$ and 5–10% KCl.

14. A process as claimed in claim 1 wherein the end bittern is recycled to reclaim excess $MgCl_2$ and bromine and produce $MgCl_2.6H_2O$ and its derivatives.

* * * * *